(12) United States Patent
Plante et al.

(10) Patent No.: US 11,578,663 B2
(45) Date of Patent: Feb. 14, 2023

(54) ENGINE FAMILY PLATFORM DESIGN

(71) Applicant: PRATT & WHITNEY CANADA CORP., Longueuil (CA)

(72) Inventors: Ghislain Plante, Verdun (CA); Keith Morgan, Westmount (CA); Stephen Mah, Brossard (CA); Patrick Valois, Longueuil (CA); Robert Peluso, St-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 483 days.

(21) Appl. No.: 16/565,736

(22) Filed: Sep. 10, 2019

(65) Prior Publication Data

US 2020/0141328 A1    May 7, 2020

Related U.S. Application Data

(60) Provisional application No. 62/729,624, filed on Sep. 11, 2018.

(51) Int. Cl.
*F02C 7/36* (2006.01)
*F01D 9/02* (2006.01)
*F02C 3/04* (2006.01)

(52) U.S. Cl.
CPC .......... *F02C 7/36* (2013.01); *F01D 9/02* (2013.01); *F02C 3/04* (2013.01); *F05D 2230/80* (2013.01); *F05D 2260/40* (2013.01)

(58) Field of Classification Search
CPC ...................................................... F02C 7/36
See application file for complete search history.

(56) References Cited

U.S. PATENT DOCUMENTS

| | | | | |
|---|---|---|---|---|
| 3,290,878 A | * | 12/1966 | Wickman | F16H 37/00 60/39.163 |
| 5,125,806 A | * | 6/1992 | Quick | F16H 47/04 417/423.6 |
| 6,148,677 A | * | 11/2000 | Evangelista | G01B 21/28 137/14 |
| 8,337,149 B1 | | 12/2012 | Hasel et al. | |
| 2006/0236675 A1 | * | 10/2006 | Weiler | F02K 3/072 60/761 |

(Continued)

FOREIGN PATENT DOCUMENTS

| WO | WO2014/204526 A2 | 12/2014 | |
|---|---|---|---|
| WO | WO-2014204526 A2 * | 12/2014 | ............... F02K 3/06 |

OTHER PUBLICATIONS

Joachim Kurzke, Ian Halliwell, Propulsion and Power An Exploration of Gas Turbine Performance Modeling, 2018, Springer International Publishing AG, part of Springer Nature 2018, May 29, 2018, pp. 115-118. (Year: 2018).*

(Continued)

*Primary Examiner* — Todd E Manahan
*Assistant Examiner* — Marc J Amar
(74) *Attorney, Agent, or Firm* — Norton Rose Fulbright Canada LLP

(57) ABSTRACT

A method of providing an engine family includes providing a first engine having a low pressure turbine driving a low pressure compressor at a first speed ratio, and a high pressure turbine driving a high pressure compressor. The method includes providing a second engine by changing the first speed ratio of the first engine to a second speed ratio.

9 Claims, 5 Drawing Sheets

(56) References Cited

U.S. PATENT DOCUMENTS

| | | | | |
|---|---|---|---|---|
| 2008/0022653 | A1* | 1/2008 | Schilling | F02K 3/06 60/226.1 |
| 2009/0293445 | A1* | 12/2009 | Ress, Jr. | F02C 7/32 60/39.15 |
| 2010/0154384 | A1* | 6/2010 | Schilling | F01D 5/03 60/268 |
| 2010/0218478 | A1* | 9/2010 | Merry | F02C 3/107 60/205 |
| 2010/0223904 | A1* | 9/2010 | Edwards | F02C 3/107 60/224 |
| 2013/0133332 | A1* | 5/2013 | Macfarlane | F04D 25/02 60/773 |
| 2013/0259654 | A1* | 10/2013 | Kupratis | F02C 7/36 415/122.1 |
| 2013/0282307 | A1* | 10/2013 | El Shamy | G06F 30/20 702/33 |
| 2014/0260295 | A1* | 9/2014 | Ullyott | F02C 3/113 60/774 |
| 2014/0290265 | A1* | 10/2014 | Ullyott | F02C 3/113 60/773 |
| 2015/0089958 | A1* | 4/2015 | Suciu | F02C 3/04 60/805 |
| 2015/0377144 | A1* | 12/2015 | Roberge | F02C 3/073 415/1 |
| 2016/0047304 | A1* | 2/2016 | Schwarz | F02C 3/107 415/66 |
| 2016/0167790 | A1* | 6/2016 | Hipsky | F02C 7/32 74/15.4 |
| 2016/0195096 | A1* | 7/2016 | Otto | F04D 25/045 415/1 |
| 2016/0229549 | A1* | 8/2016 | Mitrovic | F16H 3/666 |
| 2018/0023482 | A1* | 1/2018 | Lefebvre | F02C 3/08 415/68 |
| 2018/0066686 | A1* | 3/2018 | Engquist | B29C 65/48 |
| 2018/0073438 | A1 | 3/2018 | Durocher et al. | |
| 2019/0186348 | A1* | 6/2019 | Liu | F02B 37/10 |
| 2020/0141328 | A1* | 5/2020 | Plante | F02C 7/36 |
| 2020/0355117 | A1* | 11/2020 | Miftakhov | H01M 8/04201 |

OTHER PUBLICATIONS

Fledderjohn, Karl, The TFE731-5: Evolution of a Decade of Business Jet Service, 1983, SAE International, vol. 92, Section 3: 830693-831395, pp. 146-157. (Year: 1983).*

Rogers, Gordeon; Mathers, William; From Fighter Aircraft to Pipeline: The Development of the First "Third Generation" Aero-Derived Gas Turbine in the 16,000-18,000 HP Class, May 31-Jun. 4, 1987, The American Society of Mechanical Engineers, Gas Turbine Conference and Exhibition, Anaheim, CA, pp. 1-7. (Year: 1987).*

United Turbine Corp.: "PT6 descriptive course and guide to troubleshooting", Jun. 20, 2016 (Jun. 20, 2016), pp. 1-69, XP055662516, Retrieved from the Internet: URL:https://web.archive.org/web/20160620200612if_/http://mautone.eng.br/apostilas/propulsao1/PT6%20Training%20Manual.pdf [retrieved on Jan. 28, 2020].

European Search Report received in counterpart application No. 19196822.1 dated Feb. 12, 2020.

* cited by examiner

ENGINE FAMILY PLATFORM DESIGN

CROSS-REFERENCE TO RELATED APPLICATIONS

This application claims priority to U.S. provisional patent application No. 62/729,624 filed Sep. 11, 2018, the entire contents of which are incorporated by reference herein.

TECHNICAL FIELD

The application relates generally to gas turbine engines and, more particularly, to a modular engine architecture.

BACKGROUND

In pursuit of achieving a high performance engine, several legacy engine designs are based on a point design philosophy for a given power level. This approach is typically combined with the use of specific technologies, e.g. engine architecture, compressor design and turbine technologies, and tailor-scaling them to address the desired engine power size. The scaling approach reduces the cost of the technology development but still requires recurrent engine development and certification cost for each application. An example case illustrating this design approach is PW300 turbofan engine family.

Optimized to the customer request, these engines are optimized for low fuel consumption at its output power category. Any re-use of a given design at a different power level to cover a larger power range may however result in overweight/underperforming engine at the bottom power range or, conversely, a potential compromise in durability at the top power range.

DETAILED DESCRIPTION

According to one aspect of a particular embodiment, there is provided a new engine platform design for the architecture of a split compressor system on two spools with a low pressure spool compressor linked with an output shaft.

A modular engine platform design approach can provide a wide power range coverage. According to this philosophy several component modules can be designed in conformance with specific key interfaces and dimensional constraints.

Generally speaking the heart of the engine can be viewed as the high-spool core, i.e. high pressure compressor, combustor and high pressure turbine. Translation of core energy to propulsive energy is accomplished by the low-spool, which consists of a power turbine module designed to provide power to a load, such as a propeller or helicopter rotor.

Different engines can evolve around a specific core design on which small adjustments, such as turbine vane flow adjustment and compressor blade re-stagger could be incorporated while the low-spool components, namely the power turbine module and the reduction gearbox module, surrounding the core are interchanged/tailored to meet specific aircraft's power demand.

An extension of this modular approach is a core divided into two spools (compressor-turbine) i.e. a high pressure spool and a low pressure spool each with compressor stages. Although such multi-spool designs are known on turbofan engines, turboshaft and turboprop engines have compressors associated only with the high spool of the engine.

The advantage of a multi-spool compressor approach for turboshaft and turboprop engines is to reduce the cost of developing new engines by leveraging the engine design over several engine products, potentially covering a wide power range if desired. However, this approach may result in compromised performance relative to the best performance product that could be achieved using a single point design approach. The power range for a given core design will be limited by the design margins (speed, temperature, compressor stability) to define its capacity. These margins can lead to an overweight and a physically oversized product.

The specific characteristics of this architecture allows an optimum performance over a large power range with a common low pressure compressor.

Figure 1:
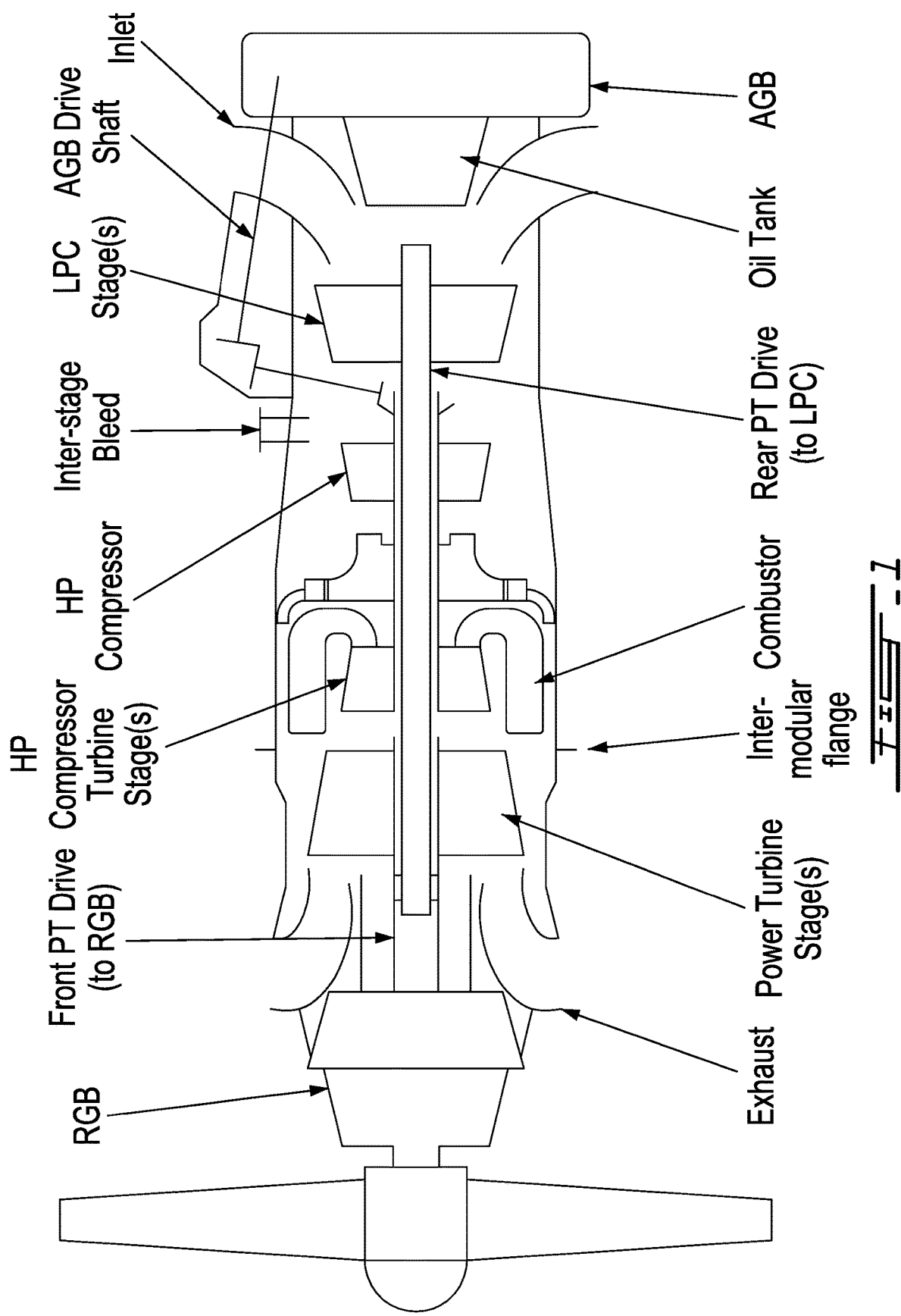
FIG. 1 is a schematic cross-sectional view of a gas turbine engine, according to an embodiment of the present disclosure.
Figure 2:
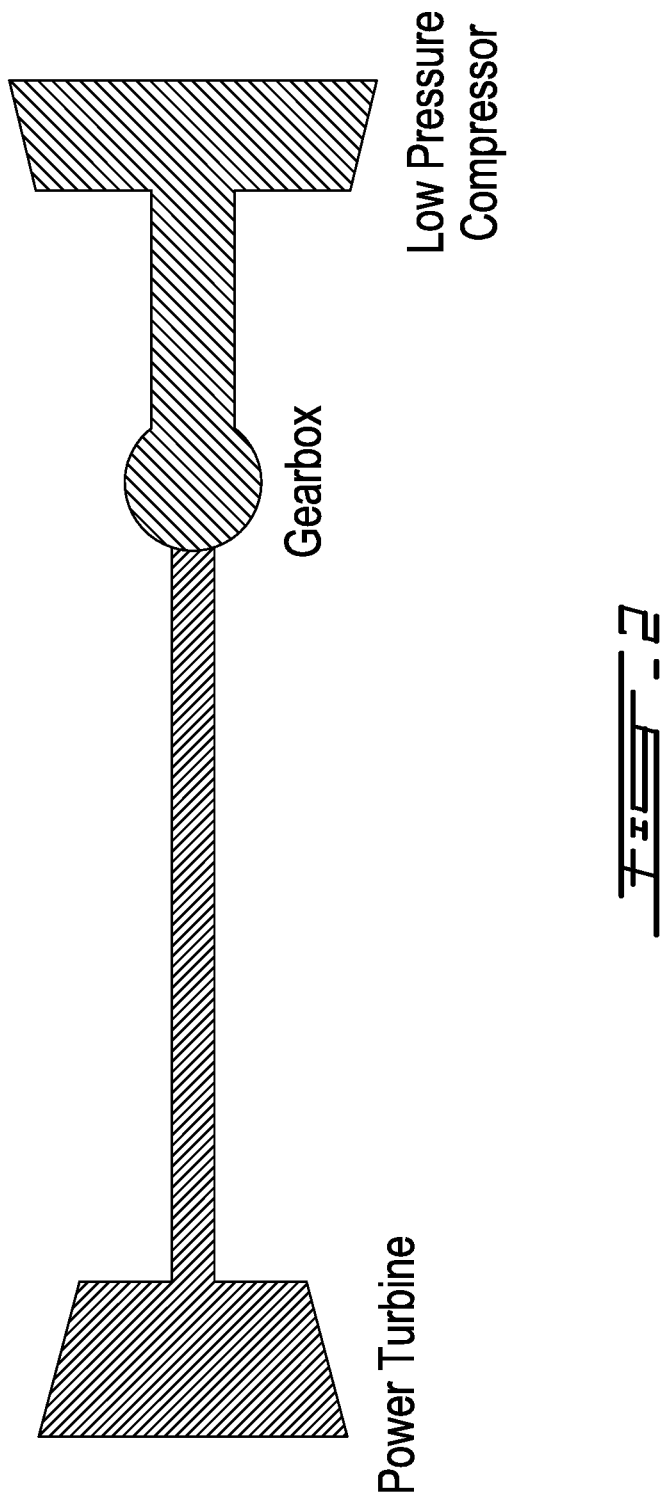
FIG. 2 is a schematic cross-sectional partial view of only the main low spool components of a gas turbine engine according to another embodiment of the present disclosure.

According to one aspect of a particular embodiment, and referring to FIGS. 1 and 2, the engine architecture under consideration is modular but with the following differentiator: the engine architecture is comprised of a split compressor system similar to a two-spools engine design but whereby the low pressure compressor is linked with the power turbine (also known as the low pressure turbine) instead of having an exclusively dedicated turbine. The low pressure compressor may be driven directly by or geared mechanically with the power turbine. This allows for a given power turbine speed to be used in a multi-engine product family, the family members having the same low pressure compressor operating at different speeds relative to one another. For example, a first engine may have the low pressure turbine and low pressure compressor (which the turbine drives) operating at the same speed (i.e. an LP turbine direct drive version of the engine) while a second engine may have the low pressure turbine and low pressure compressor (which the turbine drives) operating at a different speed (i.e. a geared version of the engine). The speed matching would alter the operating point for a given low pressure compressor design. In effect, this would significantly change the pressure ratio of the low pressure compressor, which would have an equivalent effect to changing the engine power-size design (which is conventionally a much more expensive investment in engine design and certification). The flexibility to select an optimized speed relationship between LP turbine and LP compressor may allow for re-use of the same compressor design, and in some cases the same component, at different power level in another engine design.

Figure 3:
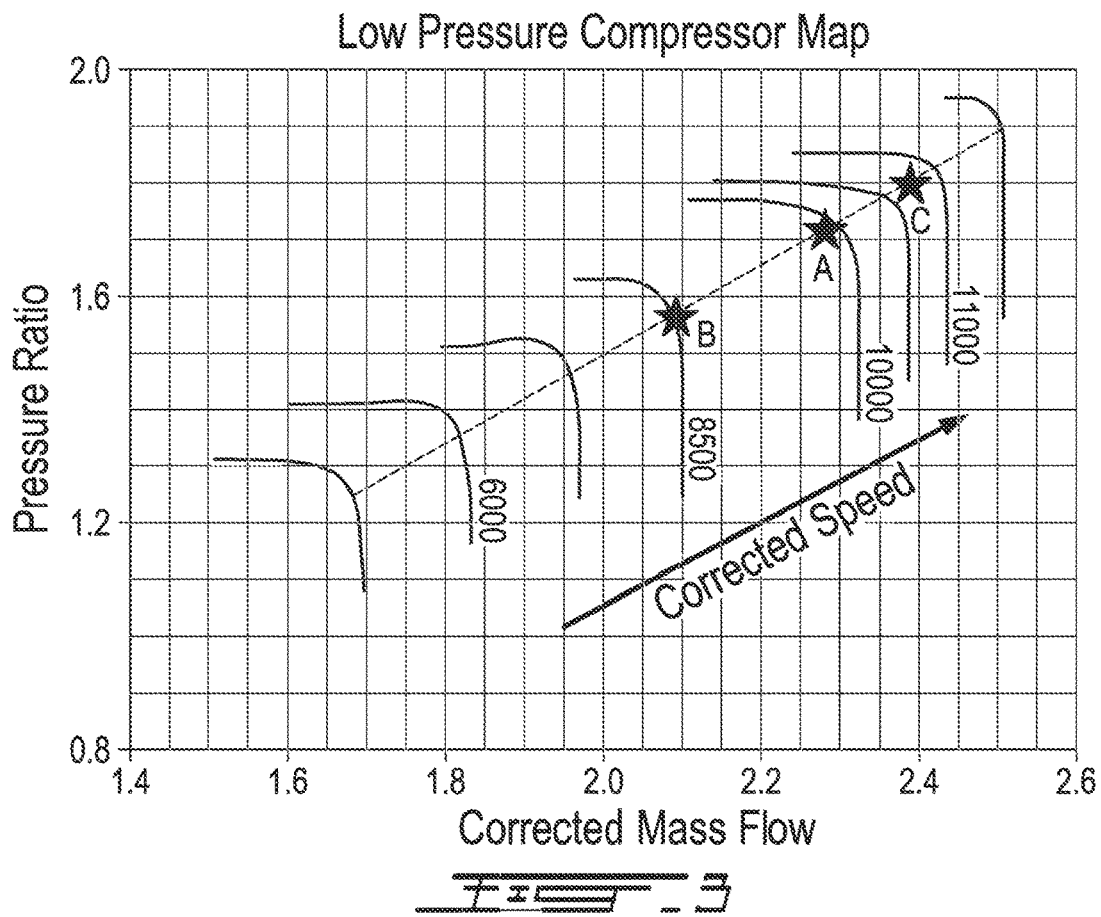
FIG. 3 is an example of a compressor map.

FIG. 3 illustrates an example of a compressor map. The depicted compressor map is a graph that describes the performance characteristics of a compressor, such as the low pressure compressor described previously, including pressure ratio and mass flow range. The Y axis represents the compressor pressure ratio (unitless), which is defined as the absolute outlet pressure divided by the absolute inlet pressure:

$$Pressure_{ratio} = \frac{P_{out}}{P_{in}} \quad (1)$$

In equation (1), Pout corresponds to the outlet pressure and Pin corresponds to the inlet pressure. The X axis of the map represents corrected mass flow in lb/s. Generally, the performance of a compressor is defined by the following temperature-corrected (or normalized) parameters:

$$N_{p\_corrected} = \frac{N}{\sqrt{\theta_i}} \quad (2)$$

$$MassFlow_{corrected} = \frac{W_i \sqrt{\theta_i}}{\delta_i} \quad (3)$$

where $$\theta_i = \frac{P_{TOTi}}{14.696} \text{ and } \theta_i = \frac{T_{TOTi}}{518.67},$$

and where "i" is the inlet to the compressor, N is the mechanical speed of the spool, $w_i$ is the compressor inlet flow, $P_{TOTi}$ is the total pressure (psia) at the compressor inlet, $T_{TOTi}$ is the total temperature (degrees Rankine) at the inlet. Equation (2) represents a formula for determining the temperature-corrected rotational speed of the compressor. Equation (3) represents a formula for determining the compressor inlet corrected mass flow.

Assuming that an engine is designed to operate at the position designated by the letter "A", this is means that the low pressure compressor (LPC) will deliver a given corrected flow and pressure ratio at a given corrected speed. If the LPC to LPT gear ratio is reduced such that the corrected speed is reduced to be in-line with the letter "B" point, then the corrected flow and pressure ratio will be reduced. Conversely, an increase of the LPC corrected speed will result in shifting the operating point to the letter "C" position.

Figure 4:
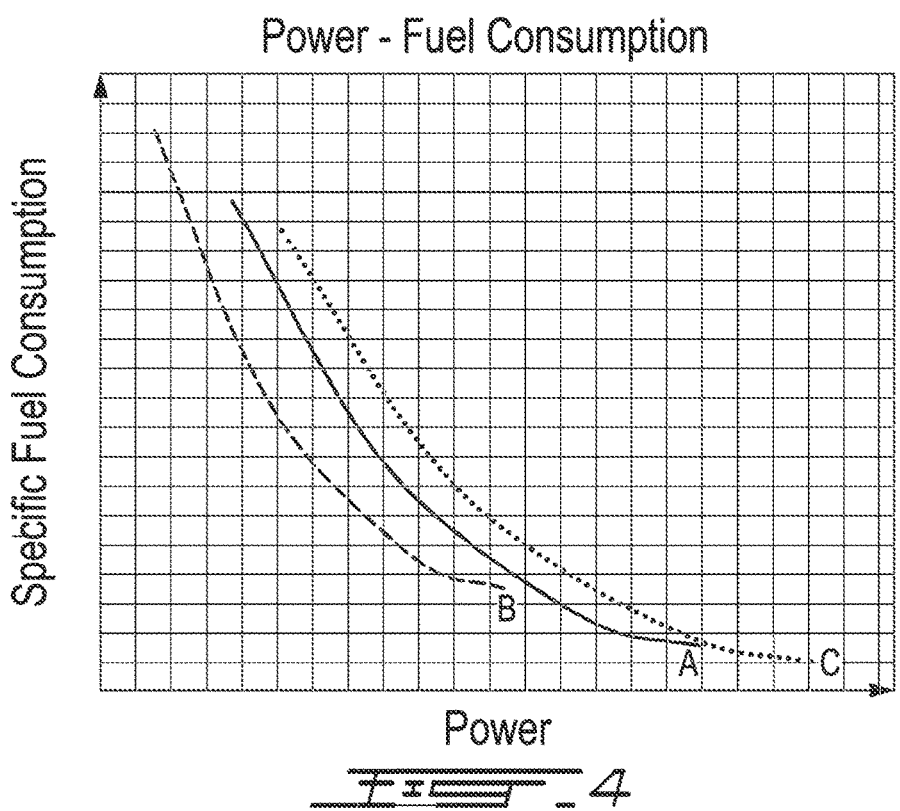
FIG. 4 is a graph plotting specific fuel consumption of a gas turbine engine as a function of power for various LPC speeds.

Associated with a core engine rematch (e.g. changing the turbine vanes area) to optimize the performance, this will result in varying the maximum power of the engine and shifting the power loop as presented on FIG. 4 for each scenario. The advantage of this approach is to offer an engine optimized for power and low fuel consumption with a lower development cost by re-using an existing design via exploiting the full capability of the low pressure compressor.

Figure 5:
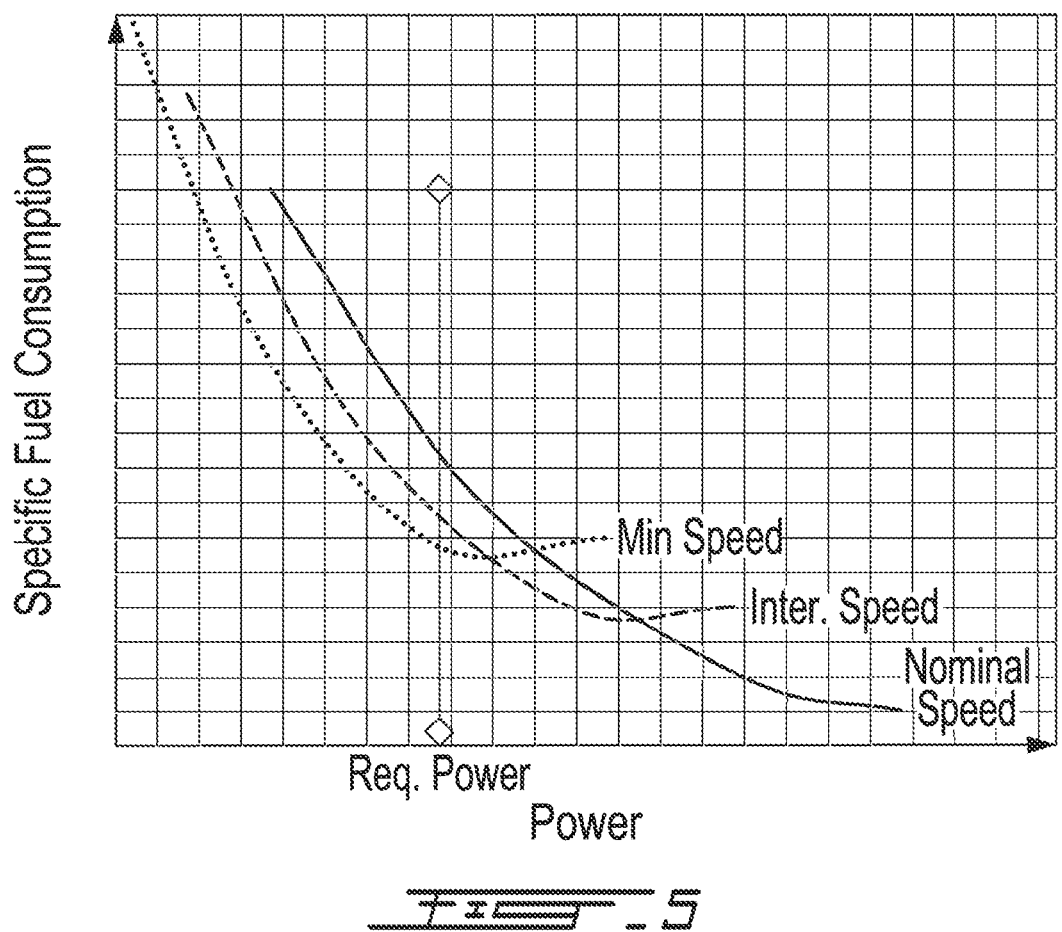
FIG. 5 is a graph plotting specific fuel consumption of a gas turbine engine as a function of power for three LPC speeds.

In conjunction to the previously described approach of increasing the power range via speed matching between LPC and LPT, FIG. 5 illustrates an alternative to get the optimum performance at a part power level (i.e. a power level lower than the maximum power). It is a unique feature associated with this type of engine configuration where the low pressure compressor is linked with the output shaft for which the speed is regulated.

For both options of LPT speed variation and LPC gearing, one advantage of the presented concept resides in the fact that the LPC speed is regulated. Fundamentally, the low pressure spool speed is reduced from the nominal speed value up to the minimum acceptable speed. Also, an intermediary speed can be selected. On the compressor map (FIG. 4), it is like moving from the point "A" to the point "B". The major difference with the option for which the LPC to LPT gear ratio is adjusted at the design stage is that the engine is matched at the design stage to the nominal speed for optimum high power performance. For the part power level (lower power), a lower speed can provide significant fuel consumption reduction as presented in FIGS. 6A and 6B.

The speed variation can be used under the following two approaches:
1) Reset the engine size to fulfill customer power requirement. In this case, the maximum power is setting the maximum operating speed for the low pressure turbine and the reduction gearbox with the propeller is set to get the required output speed.
2) The engine is sized for larger power but at a given flight segment, e.g. low speed cruise, descent, take-off, etc, the regulated low pressure turbine speed is reduced in order to improve/optimize the fuel consumption. Basically, given the nature of this configuration, this approach helps synchronize the low pressure compressor to its peak operating point as a function of the engine throttle/power setting.

Figure 6A:
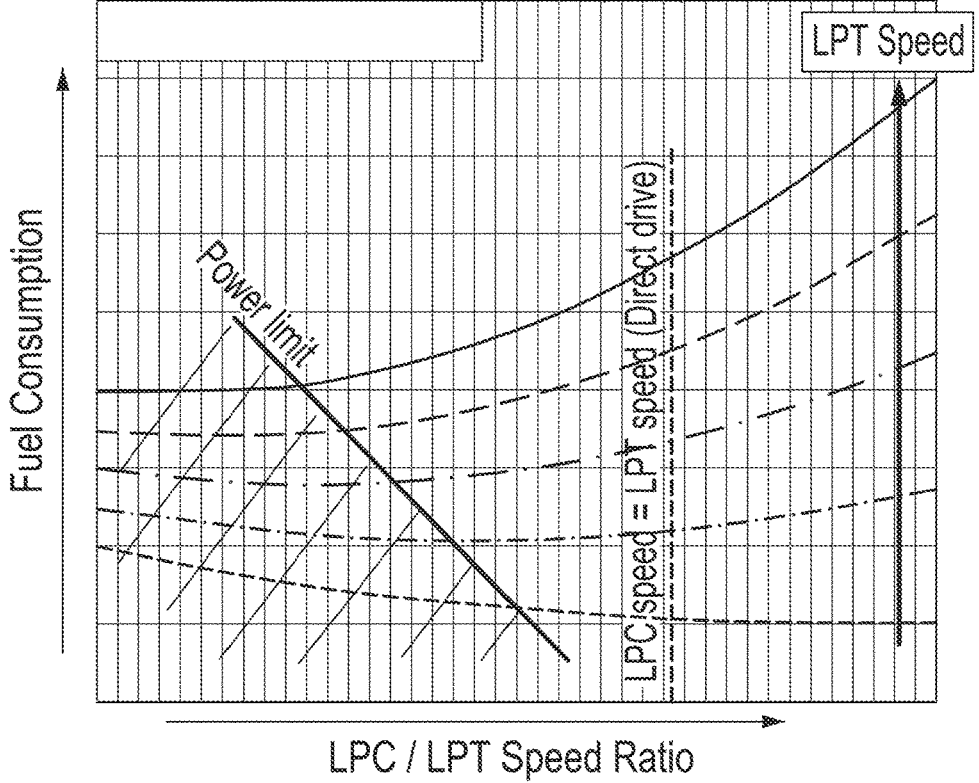
FIGS. 6A and 6B illustrate parametric combinations of gear-ratio and low spool speed for two flight conditions.
Figure 6B:
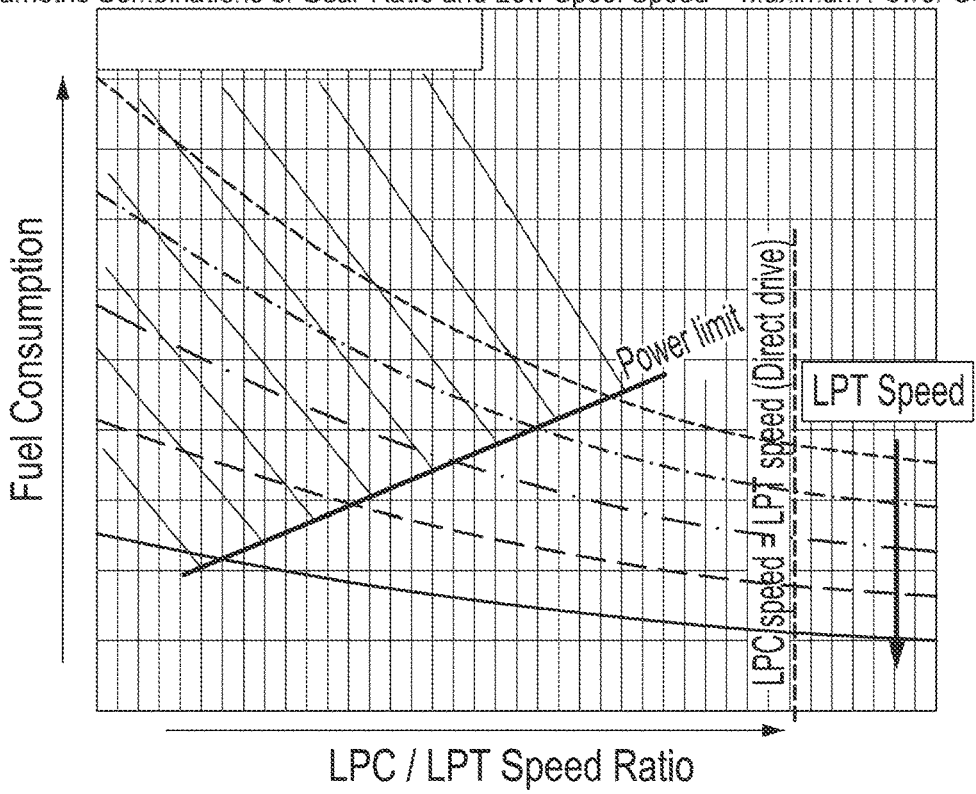

A combination of the two options i.e. gear ratio and low pressure spool speed, can be exploited in order to achieve the optimum engine for a given set of customer requirements. FIGS. 6A and 6B illustrate parametric combinations of gear-ratio and low spool speed for two flight conditions. The top figure (FIG. 6A) illustrates the case of a low power flight condition and the bottom one (FIG. 6B) at a maximum power condition.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of providing an engine family, the method comprising:
providing a first engine of the engine family having a first low pressure turbine driving a first low pressure compressor at a first speed ratio, and a high pressure turbine driving a high pressure compressor, and
providing a second engine of the engine family having a second low pressure turbine and a second low pressure compressor, the second low pressure turbine of the second engine driving the second low pressure compressor of the second engine using a gearbox at a second speed ratio different from the first speed ratio,
wherein the first low pressure compressor and the second low pressure compressor have the same size and design, wherein the first low pressure turbine and the second low pressure turbine have the same size and design, and
wherein the gearbox of the second engine is located aft of the second low pressure turbine and forward of the second low pressure compressor.

2. The method of claim 1, comprising regulating a speed of one or both of the first low pressure compressor and the second low pressure compressor.

3. The method of claim 2, wherein regulating the speed of one or both of the first low pressure compressor and the second low pressure compressor includes reducing the speed of one or both of the first low pressure compressor and the second low pressure compressor, respectively, from a nominal speed to a second speed lower than the nominal speed.

4. The method of claim 3, wherein reducing the speed of one or both of the first low pressure compressor and the second low pressure compressor includes reducing the speed from the nominal speed to an intermediary speed greater than the second speed.

5. The method of claim 1, comprising matching one or both of the first and second engines to a nominal speed to optimize the performance of said one or both of the first and second engines.

6. The method of claim 2, wherein regulating the speed of one or both of the first low pressure compressor and the second low pressure compressor includes regulating the speed of one or both of the first low pressure compressor and the second low pressure compressor, respectively, to reset a power size of the first or second engines to fulfill a power requirement.

7. The method of claim 1, comprising power sizing said one or both of the first and second engines for a specific power and reducing the speed of the respective first or second low pressure compressor at a flight segment.

8. The method of claim 7, wherein reducing the speed of the respective first or second low pressure compressor at the flight segment includes reducing the speed of the respective first or second low pressure compressor at one or more of low speed cruise, descent, and take-off.

9. The method of claim 1, comprising changing the first speed ratio of the first engine to the second speed ratio by changing a gear ratio between the second low pressure turbine and the second low pressure compressor.

* * * * *